United States Patent
Wang et al.

(10) Patent No.: US 10,073,295 B2
(45) Date of Patent: Sep. 11, 2018

(54) DIFFUSION PLATE, BACKLIGHT MODULE AND DISPLAY DEVICE

(71) Applicants: Boe Technology Group Co., Ltd., Beijing (CN); Beijing Boe Optoelectronics Technology Co., Ltd., Beijing (CN)

(72) Inventors: Chenru Wang, Beijing (CN); Wenchu Dong, Beijing (CN); Ruijun Dong, Beijing (CN); Jianjie Wu, Beijing (CN); Junjie Ma, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 44 days.

(21) Appl. No.: 15/217,462

(22) Filed: Jul. 22, 2016

(65) Prior Publication Data
US 2017/0248821 A1 Aug. 31, 2017

(30) Foreign Application Priority Data
Feb. 25, 2016 (CN) .......................... 2016 1 0105244

(51) Int. Cl.
*G02F 1/1335* (2006.01)
(52) U.S. Cl.
CPC .. *G02F 1/133606* (2013.01); *G02F 1/133608* (2013.01)
(58) Field of Classification Search
CPC ......... G02F 1/133606; G02F 1/133608; G02F 1/133602; F21V 5/002; F21V 15/01;
(Continued)

(56) References Cited

U.S. PATENT DOCUMENTS 5,676,453 A * 10/1997 Parkyn, Jr. ............ F21V 7/0091
362/260
2007/0008449 A1 1/2007 Choi
(Continued)

FOREIGN PATENT DOCUMENTS

CN 1892313 A 1/2007
CN 203365863 U 12/2013
(Continued)

OTHER PUBLICATIONS

First Office Action for Chinese Patent Application No. 201610105244.5 dated Apr. 26, 2016.

*Primary Examiner* — Bao Q Truong
(74) *Attorney, Agent, or Firm* — Calfee, Halter & Griswold LLP

(57) ABSTRACT

The present invention relates to the field of display technologies and discloses a diffusion plate, a backlight module and a display device. The diffusion plate comprises a main body structure. An accommodating slot for accommodating a light source assembly is formed within the main body structure, a support surface for supporting a display panel is formed on the surface of a side of the bottom wall of the accommodating slot which faces outside of the slot, and the accommodating slot is provided with a fixing portion for fixing the light source assembly. The above diffusion plate not only diffuses the light emitted by the light source assembly homogeneously, but also enables mounting and supporting of the light source assembly and the display panel. Moreover, the backlight module of the diffusion plate omits the structures such as a support backboard and a rubber frame, and further achieves structure simplification. Thus, the backlight module of the diffusion plate has good structural stability.

18 Claims, 2 Drawing Sheets

(58) Field of Classification Search
CPC .. F21V 19/001; F21V 19/0015; F21V 19/003; F21V 19/0035; G02B 5/02; G02B 5/0273; G02B 5/0278
See application file for complete search history.

(56) References Cited

U.S. PATENT DOCUMENTS

| | | | |
|---|---|---|---|
| 2007/0047228 A1* | 3/2007 | Thompson | G02B 6/0018 362/237 |
| 2007/0047261 A1* | 3/2007 | Thompson | G02B 6/0028 362/623 |
| 2015/0346551 A1 | 12/2015 | Sun et al. | |
| 2017/0227817 A1 | 8/2017 | Fan | |

FOREIGN PATENT DOCUMENTS

| | | |
|---|---|---|
| CN | 103712128 A | 4/2014 |
| CN | 105278160 A | 1/2016 |
| JP | H08122777 A | 5/1996 |

\* cited by examiner

--Prior Art--

DIFFUSION PLATE, BACKLIGHT MODULE AND DISPLAY DEVICE

RELATED APPLICATIONS

The present application claims the benefit of Chinese Patent Application No. 201610105244.5, filed on Feb. 25, 2016, the entire disclosure of which is incorporated herein by reference.

TECHNICAL FIELD

The present invention relates to the field of display technologies, and especially to a diffusion plate, a backlight module and a display device.

BACKGROUND

At present, special-shaped display device structures proposed in the industry are all organic light emitting diode (OLED) display products. However, the OLED products have high cost and shorter lifetime than the liquid crystal display (LCD) products. Furthermore, a special-shaped backlight structure for the LCD products is developed in recent years. FIG. 1 shows a direct type special-shaped backlight module structure. The direct type special-shaped backlight module comprises a support backboard 10 and a support rubber frame 20 located in the support backboard 10, a light source assembly 30, a diffusion plate 40, and so on. As shown in FIG. 1, due to a lot of structural components thereof and complicated assembling process, the structural stability of the special-shaped backlight structure is relatively poor, and the product yield is low.

SUMMARY

Embodiments of the present invention provide a diffusion plate, a backlight module and a display device, wherein the diffusion plate is used to simplify the prior art backlight module structure and improve the structural stability of the backlight module.

In accordance with one aspect of the present invention, a diffusion plate is provided, which comprises a main body structure. An accommodating slot for accommodating a light source assembly is formed within the main body structure, a support surface for supporting a display panel is formed on the surface of a side of a bottom wall of the accommodating slot which faces outside of the slot, and the accommodating slot is provided with a fixing portion for fixing the light source assembly.

An accommodating slot is formed within the main body structure of the above diffusion plate. A light source assembly may be accommodated and mounted in the accommodating slot and a display panel may be mounted at the outer side of the bottom wall of the accommodating slot. In the accommodating slot, light emitted by the light source assembly can be homogenized in a space between the bottom wall of the accommodating slot and the light source assembly. Moreover, the homogenized light can be further diffused homogeneously via the bottom wall of the accommodating slot and then provided to the display panel at the outer side of the bottom wall. In conclusion, the diffusion plate not only diffuses the light of the light source assembly homogeneously, but also enables mounting and supporting of the light source assembly and the display panel. Accordingly, a backlight module utilizing the diffusion plate can omit the structures such as a support backboard and a rubber frame etc. and further achieve structure simplification, and thus has good structural stability.

In an alternative embodiment, the fixing portion is located at a slot edge of the accommodating slot.

In an alternative embodiment, the fixing portion is mounted on a side wall of the accommodating slot.

In an alternative embodiment, the fixing portion is a groove provided on the side wall of the accommodating slot.

In an alternative embodiment, the fixing portion is a protrusion structure provided on the side wall of the accommodating slot.

In an alternative embodiment, an end face of the protrusion structure is a wedge-shaped face.

In an alternative embodiment, the surface of a side of the side wall of the accommodating slot which faces outside of the slot is provided with a light-shielding layer.

In an alternative embodiment, the light-shielding layer is a black ink layer.

In accordance with another aspect of the present invention, a backlight module is provided, which comprises the diffusion plate according to any one of the above technical solutions, and a light source assembly mounted in the accommodating slot of the diffusion plate in a fixed manner.

In an alternative embodiment, the light source assembly comprises a circuit board and a light emitting diode (LED) mounted on the circuit board, wherein the circuit board is mounted on the diffusion plate in a fixed manner via a fixing portion in the accommodating slot.

In accordance with another aspect of the present invention, a display device is provided, which comprises the backlight module according to any one of the above technical solutions, and a display panel located at a side of a bottom wall of an accommodating slot of a diffusion plate which faces outside of the slot in the backlight module.

DETAILED EMBODIMENTS

The technical solutions in embodiments of the present invention will be clearly and comprehensively described below with reference to the drawings in embodiments of the present invention. Obviously, the described embodiments are just a part of the embodiments of the present invention rather than all of them. All other embodiments obtained by those ordinarily skilled in the art on the basis of the embodiments of the present invention without inventive efforts fall within the protection scope of the present invention.

Figure 1:
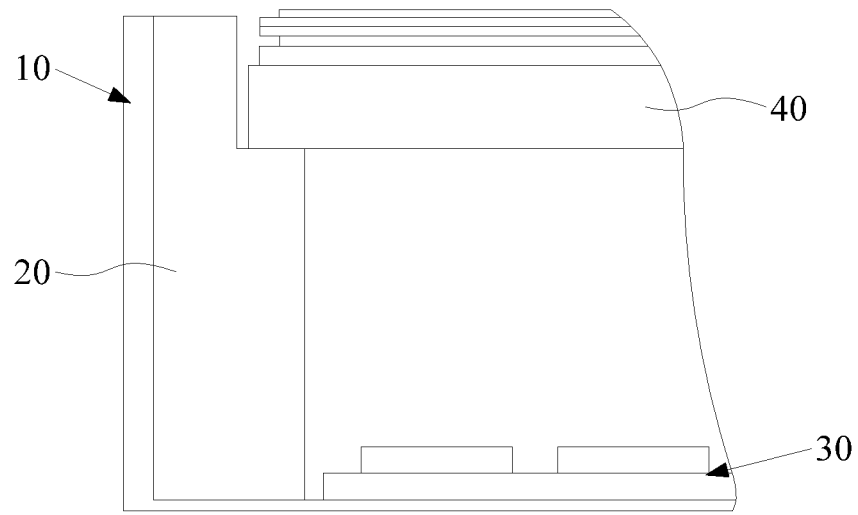
FIG. 1 is a sectional structural schematic diagram of a display device in the prior art.
Figure 2:
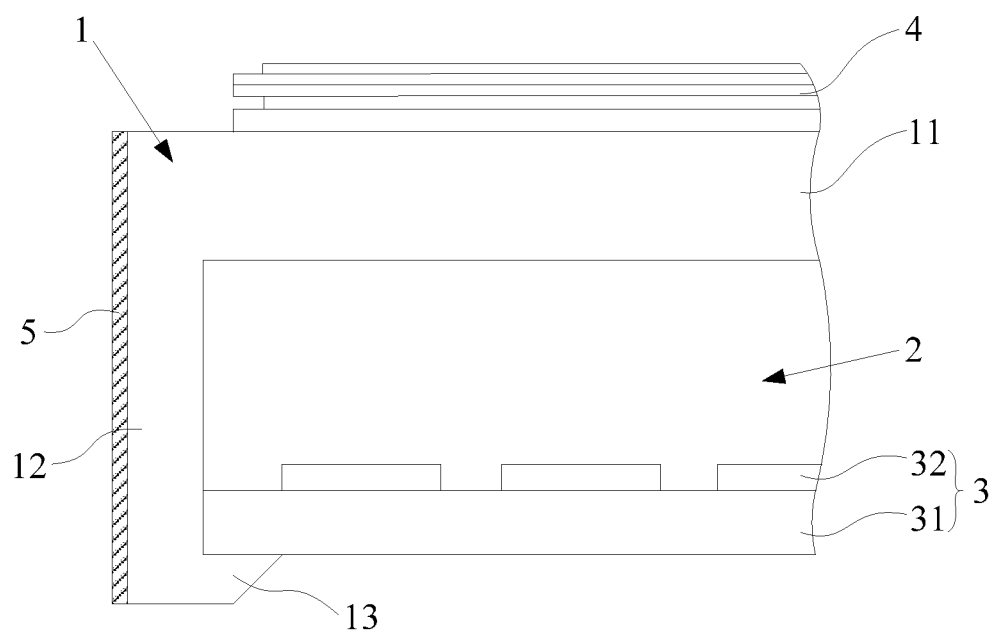
FIG. 2 is a sectional structural schematic diagram of a display device provided by an embodiment of the present invention.
Figure 3:
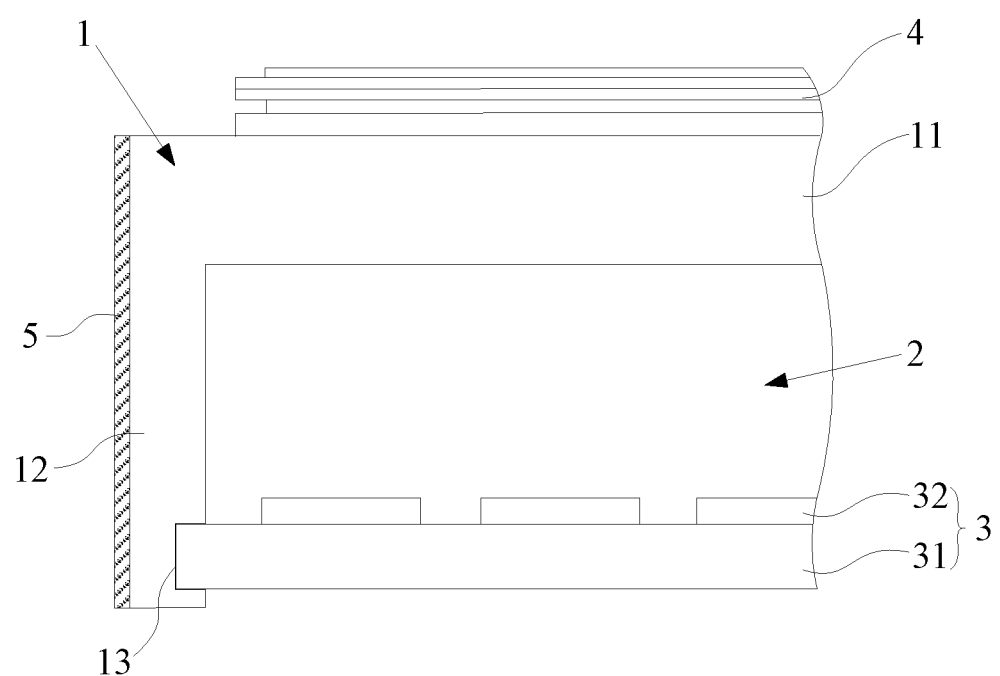
FIG. 3 is a sectional structural schematic diagram of a display device provided by another embodiment of the present invention.

As shown in FIGS. 2 and 3, a diffusion plate provided by embodiments of the present invention comprises a main body structure 1. An accommodating slot 2 for accommodating a light source assembly 3 is formed within the main body structure 1. A support surface for supporting a display panel 4 is formed on the surface of a side of a bottom wall 11 of the accommodating slot 2 which faces outside of the slot. The accommodating slot 2 is provided with a fixing portion 13 for fixing the light source assembly 3.

The accommodating slot 2 is formed within the main body structure 1 of the above diffusion plate. The light source assembly 3 may be accommodated and mounted in the accommodating slot 2 and the display panel 4 may be mounted at the outer side of the bottom wall 11 of the accommodating slot 2. In the accommodating slot 2, light emitted by the light source assembly 3 can be homogenized in a space between the bottom wall 11 of the accommodating slot 2 and the light source assembly 3. Moreover, the homogenized light can be further diffused homogeneously via the bottom wall 11 of the accommodating slot 2 and then provided to the display panel 4 at the outer side of the bottom wall 11. In conclusion, the diffusion plate not only diffuses the light of the light source assembly 3 homogeneously, but also enables mounting and supporting of the light source assembly 3 and the display panel 4. Accordingly, a backlight module utilizing the diffusion plate can omit the structures such as a support backboard and a rubber frame and further achieve structure simplification, and thus has good structural stability.

As shown in FIGS. 2 and 3, in a specific embodiment, the fixing portion 13 provided on a side wall 12 of the accommodating slot 2 may be located at the slot edge of the accommodating slot 2.

Since the fixing portion 13 is located at the slot edge within the accommodating slot 2, it is possible to make the light source assembly 3 fixedly mounted via the fixing portion 13 also located at a position close to the slot edge within the accommodating slot 2, i.e. making the light source assembly 3 far from the bottom wall 11 of the accommodating slot 2. At that time, a large light homogenizing space can be formed between the light source assembly 3 and the bottom wall 11 of the accommodating slot 2. Consequently, light exiting from the bottom wall 11 of the accommodating slot 2, i.e. light provided to the display panel 4, may be more homogeneous.

On the basis of the above embodiments, in a specific embodiment, the fixing portion 13 may be arranged on the side wall 12 of the accommodating slot 2, as shown in FIGS. 2 and 3. Specifically, since the light source assembly 3 generally comprises a circuit board 31 and a light emitting diode LED 32 mounted on the circuit board 31, the fixing portion 13 provided on the side wall 12 of the accommodating slot 2 can be implemented in two modes as follows.

In the first implementation, as shown in FIG. 3, the fixing portion 13 is a groove provided on the side wall 12 of the accommodating slot 12. Preferably, the groove is an annular groove extending along the slot edge of the accommodating slot 2.

In the light source assembly 3, the edge of the circuit board 31 can be seized into the groove provided on the side wall 12 of the accommodating slot 2 and is thereby fixed. Therefore, the whole light source assembly 3 can be mounted in the accommodating slot 2 in a fixed manner and arranged opposite to the bottom wall 11 (light exit surface of the diffusion plate) of the accommodating slot 2. Consequently, the above diffusion plate and the light source assembly 3 can form a direct type backlight structure. Moreover, since in the light source assembly 3 the circuit board 31 and the bottom wall 11 (i.e. light exit surface of the diffusion plate) of the accommodating slot 2 are arranged opposite to each other, and the side of the circuit board 31 where the light emitting diode LED 32 is mounted is arranged towards the bottom wall 11 of the accommodating slot 2, a light homogenizing space can be formed between the circuit board 31 and the bottom wall 11 of the accommodating slot 2. Furthermore, the circuit board 31 can completely shield the slot opening of the accommodating slot 2, thereby preventing the light emitted by the light emitting diode LED 32 from exiting from the slot opening.

In the second implementation, as shown in FIG. 2, the fixing portion 13 is a protrusion structure provided on the side wall 12 of the accommodating slot 2. Preferably, the end face of the protrusion structure is a wedge-shaped face.

In the light source assembly 3, the edges of the circuit board 31 can be mounted on the protrusion structure in a fixed manner. Therefore, the whole light source assembly 3 can be mounted within the accommodating slot 2 in a fixed manner and arranged opposite to the bottom wall 11 (i.e. light exit surface of the diffusion plate) of the accommodating slot 2. Consequently, the above diffusion plate and the light source assembly 3 can form a direct type backlight structure. Moreover, since in the light source assembly 3 the circuit board 31 and the bottom wall 11 of the accommodating slot 2 are arranged opposite to each other, and the side of the circuit board 31 where the light emitting diode LED 32 is mounted is arranged towards the bottom wall 11 of the accommodating slot 2, a light homogenizing space can be formed between the circuit board 31 and the bottom wall 11 of the accommodating slot 2. Furthermore, the circuit board 31 can completely shield the slot opening of the accommodating slot 2, thereby preventing the light emitted by the light emitting diode LED 32 from exiting from the slot opening. In addition, as shown in FIG. 2, the circuit board 31 can be mounted on the side of the protrusion structure which faces the bottom wall 11 of the accommodating slot 2, i.e. at the inner side of the protrusion structure, so as to make the whole direct type backlight structure more reliable. At that time, the wedge-shaped end face of the protrusion structure facilitates mounting of the circuit board 31 at the inner side of the protrusion structure.

As shown in FIGS. 2 and 3, on the basis of the above embodiments, in a specific embodiment, the surface of the side of the side wall 12 of the accommodating slot 2 which faces outside of the slot is provided with a light-shielding layer 5.

The above light-shielding layer 5 can prevent the light within the accommodating slot 2 from exiting from the side wall 12 of the accommodating slot 2, which can consequently ensure that all light of the light source assembly 3 exits from the bottom wall 11 of the accommodating slot 2 and enters the display panel 4, and further guarantee the light energy utilization ratio of the backlight module.

Preferably, the light-shielding layer 5 may be a black ink layer.

As shown in FIGS. 2 and 3, the present invention further provides a backlight module comprising the diffusion plate according to any one of the above embodiments, and a light source assembly 3 mounted within an accommodating slot 2 of the diffusion plate in a fixed manner.

In the backlight module, the diffusion plate not only diffuses the light of the light source assembly 3 homogeneously, but also enables mounting and supporting of the light source assembly 3 and the display panel 4. Therefore, the backlight module can omit the structures such as a support backboard and a rubber frame, thereby achieving structure simplification. The backlight module provided by embodiments of the present invention thereby has high structural stability.

As shown in FIGS. 2 and 3, on the basis of the above embodiments, in a specific embodiment, the light source assembly 3 may comprise a circuit board 31 and a light emitting diode (LED) 32 mounted on the circuit board 31, wherein the circuit board 31 is mounted on the diffusion plate via a fixing portion 13 in an accommodating slot.

As shown in FIGS. 2 and 3, the present invention further provide a display device comprising the backlight module according to any one of the above embodiments, and further comprising a display panel 4 located at the side of the bottom wall 11 of the accommodating slot 2 of the diffusion plate which faces outside of the slot in the backlight module.

Obviously, those skilled in the art can make various modifications and variations to the embodiments of the present invention without departing from the spirit and scope thereof. In this way, if these modifications and variations to the present disclosure are within the scope of the claims of the present invention and equivalent technologies thereof, the present invention also intends to encompass these modifications and variations. The wording "comprise" does not exclude other elements or steps not listed in the claims. The wording "a" or "an" preceding an element does not exclude the presence of a plurality of such elements. The mere fact that certain measures are recited in mutually different dependent claims does not indicate that a combination of these measures cannot be used to advantage. Any reference signs in the claims should not be construed as limiting the scope.

The invention claimed is:

1. A diffusion plate comprising a main body structure, an accommodating slot for accommodating a light source assembly being formed within the main body structure, a support surface for supporting a display panel being formed on a surface of a side of a bottom wall of the accommodating slot which faces outside of the slot, the accommodating slot being provided with a fixing portion for fixing the light source assembly.

2. The diffusion plate according to claim 1, wherein the fixing portion is located at a slot edge of the accommodating slot.

3. The diffusion plate according to claim 1, wherein the fixing portion is mounted on a side wall of the accommodating slot.

4. The diffusion plate according to claim 3, wherein the fixing portion is a groove provided on the side wall of the accommodating slot.

5. The diffusion plate according to claim 3, wherein the fixing portion is a protrusion structure provided on the side wall of the accommodating slot.

6. The diffusion plate according to claim 5, wherein an end face of the protrusion structure is a wedge-shaped face.

7. The diffusion plate according to claim 1, wherein a surface of a side of the side wall of the accommodating slot which faces outside of the slot is provided with a light-shielding layer.

8. The diffusion plate according to claim 2, wherein a surface of a side of the side wall of the accommodating slot which faces outside of the slot is provided with a light-shielding layer.

9. The diffusion plate according to claim 3, wherein a surface of a side of the side wall of the accommodating slot which faces outside of the slot is provided with a light-shielding layer.

10. The diffusion plate according to claim 4, wherein a surface of a side of the side wall of the accommodating slot which faces outside of the slot is provided with a light-shielding layer.

11. The diffusion plate according to claim 5, wherein a surface of a side of the side wall of the accommodating slot which faces outside of the slot is provided with a light-shielding layer.

12. The diffusion plate according to claim 6, wherein a surface of a side of the side wall of the accommodating slot which faces outside of the slot is provided with a light-shielding layer.

13. The diffusion plate according to claim 7, wherein the light-shielding layer is a black ink layer.

14. A backlight module comprising the diffusion plate according to claim 1, and a light source assembly mounted in an accommodating slot of the diffusion plate in a fixed manner.

15. The backlight module according to claim 9, wherein the light source assembly comprises a circuit board and a light emitting diode (LED) mounted on the circuit board, the circuit board being mounted on the diffusion plate in a fixed manner via a fixing portion in the accommodating slot.

16. A backlight module comprising the diffusion plate according to claim 7, and a light source assembly mounted in an accommodating slot of the diffusion plate in a fixed manner.

17. A display device comprising the backlight module according to claim 14, and a display panel located at the side of the bottom wall of the accommodating slot of the diffusion plate which faces outside of the slot in the backlight module.

18. A display device comprising the backlight module according to claim 15, and a display panel located at the side of the bottom wall of the accommodating slot of the diffusion plate which faces outside of the slot in the backlight module.

* * * * *